(12) United States Patent
Thibodeaux et al.

(10) Patent No.: US 11,962,708 B2
(45) Date of Patent: Apr. 16, 2024

(54) RESUME DOCUMENT PARSING USING COMPUTER VISION AND OPTICAL CHARACTER RECOGNITION WITH REBLOCKING FEEDBACK

(71) Applicant: Indeed, Inc., Austin, TX (US)

(72) Inventors: Lawrence Thibodeaux, Sunnyvale, CA (US); Gokhan Ozer, Sunnyvale, CA (US); Chinwei Hu, Sunnyvale, CA (US); Jesse Rohwer, Springhill, TN (US); Eugene Raether, Sunnyvale, CA (US)

(73) Assignee: Indeed, Inc., Austin, TX (US)

( * ) Notice: Subject to any disclaimer, the term of this patent is extended or adjusted under 35 U.S.C. 154(b) by 114 days.

(21) Appl. No.: 17/331,463

(22) Filed: May 26, 2021

(65) Prior Publication Data

US 2023/0215206 A1 Jul. 6, 2023

Related U.S. Application Data

(60) Provisional application No. 63/030,287, filed on May 26, 2020.

(51) Int. Cl.
*G06V 30/414* (2022.01)
*G06F 3/04812* (2022.01)
(Continued)

(52) U.S. Cl.
CPC ........ *H04L 9/3268* (2013.01); *G06F 3/04812* (2013.01); *G06F 3/0482* (2013.01);
(Continued)

(58) Field of Classification Search
CPC ........ G06N 20/00; G06N 3/0454; G06N 3/08; G06N 20/20; G06N 3/091; G06N 3/092;
(Continued)

(56) References Cited

U.S. PATENT DOCUMENTS

2013/0318425 A1\* 11/2013 Mathai .................. G06F 40/174
715/221
2018/0314973 A1\* 11/2018 Sinha ...................... G06N 20/00
(Continued)

*Primary Examiner* — Matthew C Bella
*Assistant Examiner* — Dennis Rosario
(74) *Attorney, Agent, or Firm* — Young Basile Hanlon & MacFarlane, P.C.

(57) ABSTRACT

Systems and methods are disclosed for parsing resume documents using computer vision and optical character recognition technology in combination with a user feedback interface system to facilitate user feedback to improve the overall processing quality of the resumes that are imported into computer resume processing systems. In at least one embodiment, the system and method prompt a user to upload an input resume document, which is processed with a first parsing pass to generate initial resume data by extracting a plurality of resume text blocks. Further processing identifies an initial set of bounding blocks and to visually displays the initial resume data for user review and feedback to regroup one or more of the initial set of bounding blocks into a regrouped bounding block. Additional processing consolidates into a group text block each of the resume text blocks corresponding to the regrouped one or more of the initial set of bounding blocks.

22 Claims, 9 Drawing Sheets

(51) Int. Cl.
| | |
|---|---|
| G06F 3/0482 | (2013.01) |
| G06F 3/0485 | (2022.01) |
| G06F 11/32 | (2006.01) |
| G06F 11/34 | (2006.01) |
| G06F 16/9035 | (2019.01) |
| G06F 16/957 | (2019.01) |
| G06F 18/21 | (2023.01) |
| G06F 18/214 | (2023.01) |
| G06F 18/40 | (2023.01) |
| G06F 40/131 | (2020.01) |
| G06N 3/09 | (2023.01) |
| G06N 20/00 | (2019.01) |
| G06Q 10/1053 | (2023.01) |
| G06Q 10/109 | (2023.01) |
| G06V 30/14 | (2022.01) |
| G06V 30/18 | (2022.01) |
| G06V 30/416 | (2022.01) |
| H04L 9/32 | (2006.01) |
| H04L 9/40 | (2022.01) |
| H04L 65/403 | (2022.01) |
| G06Q 30/0242 | (2023.01) |

(52) U.S. Cl.
CPC ............ *G06F 3/0485* (2013.01); *G06F 11/32* (2013.01); *G06F 11/3409* (2013.01); *G06F 11/3438* (2013.01); *G06F 16/9035* (2019.01); *G06F 16/957* (2019.01); *G06F 18/2155* (2023.01); *G06F 18/2163* (2023.01); *G06F 18/2178* (2023.01); *G06F 18/40* (2023.01); *G06F 40/131* (2020.01); *G06N 3/09* (2023.01); *G06N 20/00* (2019.01); *G06Q 10/1053* (2013.01); *G06Q 10/109* (2013.01); *G06V 30/1456* (2022.01); *G06V 30/18086* (2022.01); *G06V 30/414* (2022.01); *G06V 30/416* (2022.01); *H04L 9/3247* (2013.01); *H04L 63/0428* (2013.01); *H04L 63/166* (2013.01); *H04L 65/403* (2013.01); *G06F 11/3452* (2013.01); *G06F 2203/04803* (2013.01); *G06Q 30/0243* (2013.01); *G06T 2210/12* (2013.01)

(58) Field of Classification Search
CPC ........ G06N 3/094; G06N 3/096; G06N 3/098; G06N 3/09; G06N 3/088; G06F 3/04842; G06F 30/27; G06F 3/0482; G06F 18/2178; G06F 18/217; G06F 18/21; G06F 40/279; G06F 18/211; G06F 18/2155; G06F 40/20; G06F 40/205; G06F 16/3329; G06F 16/93; G06F 40/10; G06F 40/106; G06F 40/14; G06F 40/154; G06F 40/131; G06F 40/12; G06F 40/40; G06V 10/70; G06V 10/82; G06V 10/764; G06V 30/414; G06V 30/412; G06V 30/41; G06V 30/413; G06V 30/416; G06V 30/42; G06V 30/10; G06V 30/40; G06V 30/19173; G06V 30/245; G06V 30/24; G06V 10/25; G06V 10/778; G06V 10/7784; G06V 10/7788; G06V 20/63; G06V 30/00; G06V 30/1444; G06V 30/1448; G06V 30/1456; G06V 30/18086; G06T 2207/20081; G06T 2210/12

See application file for complete search history.

(56) References Cited

U.S. PATENT DOCUMENTS

| | | | |
|---|---|---|---|
| 2020/0151647 | A1* | 5/2020 | Kathalagiri Somashekariah ........ G06N 20/00 |
| 2020/0380060 | A1* | 12/2020 | Siani Cohen ........ G06N 3/0445 |
| 2020/0394615 | A1* | 12/2020 | Sethre ................ G06Q 10/1053 |

* cited by examiner

RESUME DOCUMENT PARSING USING COMPUTER VISION AND OPTICAL CHARACTER RECOGNITION WITH REBLOCKING FEEDBACK

CROSS-REFERENCE TO RELATED APPLICATION

This application claims the benefit under 35 U.S.C. § 119(e) and 37 C.F.R. § 1.78 of U.S. Provisional Patent Application No. 63/030,287, entitled "Systems and Methods to Enhance Technology Including Employment and Security Related Technology" filed on May 26, 2020, which is incorporated by reference in its entirety as is fully set forth herein.

FIELD OF THE INVENTION

The present disclosure relates in general to the field of machine learning. In one aspect, the present disclosure relates generally to artificial intelligence job recommendation systems for processing resumes into a form suitable for matching job applicants with job requirements.

DESCRIPTION OF THE RELATED ART

Job recommendation systems are increasingly used as an online resource for helping match people with jobs. Such systems typically require automated input of the job applicant's qualifications (or employer's job requirements) by using information extraction techniques to scan and convert input information (e.g., an applicant's resume) into a form that is usable by computer processors, such as for machine understanding of resume content and subsequent processing, such as matching with job requirements. While there are resume input systems which use extraction services, such as Google's Cloud Vision API, to automatically extract structured information from input resumes, there are many different styles and formats used in resumes which limit the ability of such services to accurately construct resume information that is needed to support the automatic construction of database, searching and resume matching or routing services. For example, parsing errors can arise when processing resumes having a two-column format. In addition, the definition of expected resume information fields can vary between different job applicants, causing processing errors when an expected information (e.g., the applicant's name, job title, or work experience dates) is not listed on the input resume. In addition to creating parsing errors, different resume formats can cause errors in identifying and/or labelling boundary blocks in the input resume. For example, extraction services have difficulty processing resume information that is formatted with a bulleted or multi-column layout of information, resulting in extracted text blocks being incorrectly grouped into one or more boundary blocks. As seen from the foregoing, existing job recommendation systems do not provide accurate extraction of structured information from input resumes that is needed for correctly matching job applicants with job requirements.

SUMMARY

A system, apparatus, and methodology are described for efficiently and accurately processing input resumes and/or job descriptions by using computer vision and optical character recognition technology to generate OCR resume image data having initial bounding blocks around identified text blocks, and the using a user feedback interface system to show the OCR resume image data and to solicit user feedback for selecting and regrouping the initial bounding blocks to match backend generated labels, thereby improving the computer functionality to provide high quality and accurate processing of the resumes that are imported into computer resume processing systems.

In another form, there is disclosed herein a system, method, apparatus, and computer program product for enhancing operable functionality of a resume parsing system by performing a method at a device having a processor and memory for parsing resume documents. As disclosed, the system, method, apparatus, and computer program prompt a user with frontend code to upload an input resume document. Subsequently, a first parsing pass of the input resume document is performed with backend code to generate initial resume data by extracting a plurality of resume text blocks and to identifying an initial set of bounding blocks, each of which surrounds a corresponding resume text block. In selected embodiments, the first parsing pass is performed by invoking a computer vision and optical character recognition extraction service to automatically extract structured information from the input resume document. In other embodiments, the initial set of bounding block(s) may surround corresponding resume text blocks located on different lines of the input resume document. In addition, the frontend code visually displays the initial resume data for user review of the initial set of bounding blocks surrounding the corresponding resume text blocks. In selected embodiments, the input resume document is visually displayed by generating and displaying a user interface display screen which displays to the user the input resume document with the initial set of bounding blocks and corresponding resume text blocks. The frontend code also prompts a user to provide feedback to regroup one or more of the initial set of bounding blocks into a regrouped bounding block and to consolidate into a group text block each of the resume text blocks corresponding to the regrouped one or more of the initial set of bounding blocks. In selected embodiments, the user is prompted to provide feedback by generating and displaying a display control panel which includes user control and feedback for selecting and regrouping the one or more of the initial set of bounding blocks into the regrouped bounding block. In addition, the frontend code prompts the user to create a label for the regrouped bounding block and group text block. In selected embodiments, the user is prompted to create a label by generating and displaying a display control panel which includes user control and feedback buttons and/or fields for labelling the regrouped bounding block. The backend code may then store in memory regrouped bounding block data identifying the regrouped bounding block, the group text block and the label for the regrouped bounding block and group text block. In addition, the system, method, apparatus, and computer program product may store training data comprising the regrouped bounding block data and original bounding block data identifying the initial set of bounding blocks and the corresponding resume text blocks. Though selected embodiments are described with reference to a resume parsing system for processing input resume documents submitted by the user to a job recommendation system, it will be appreciated that the present disclosure may also be implemented as a job recommendation system which processes input job description documents submitted by an employer.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

Figure 1:
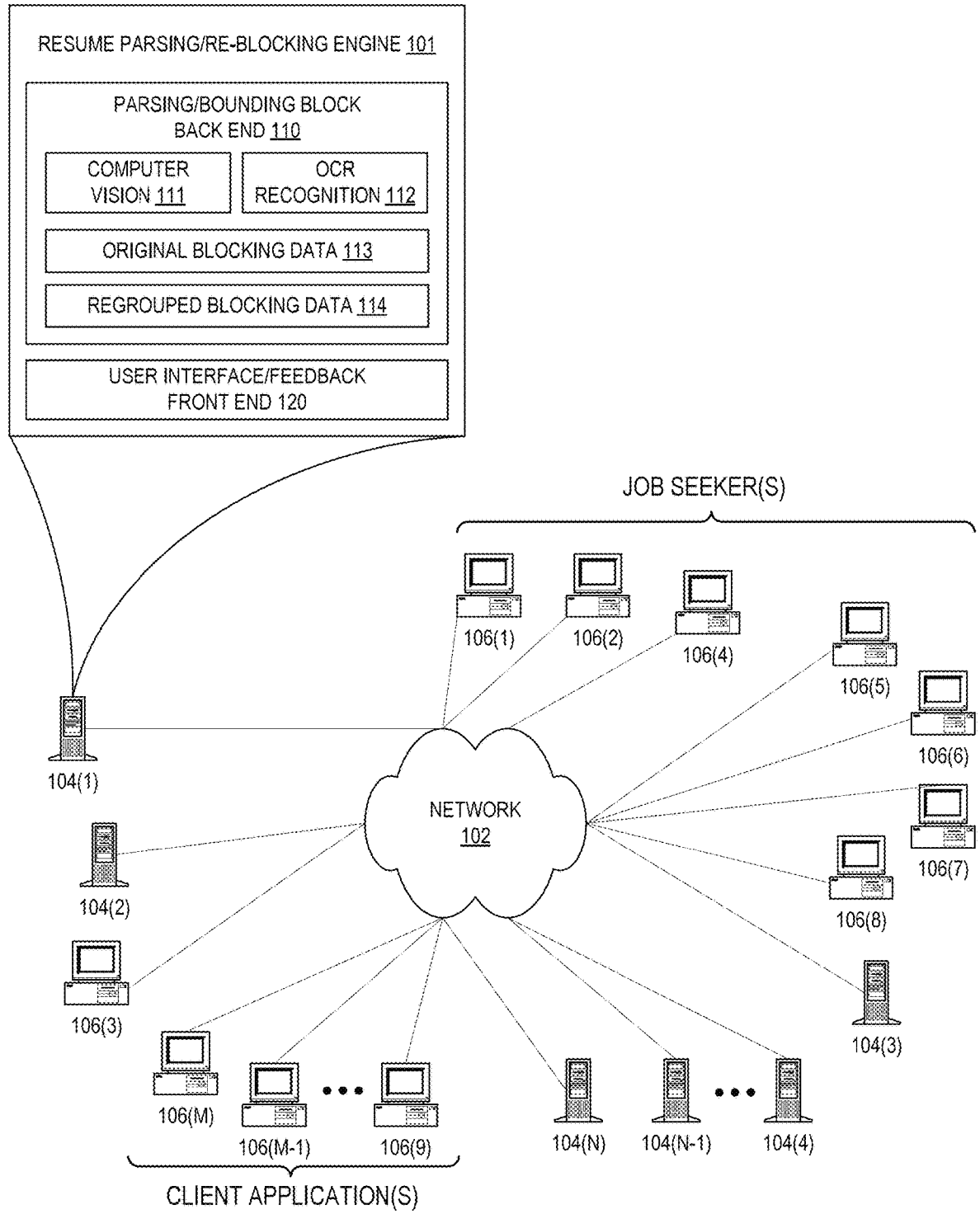
FIG. 1 is a block diagram illustration of a network environment in which resume parsing and reblocking may be practiced in accordance with selected embodiments of the present disclosure.

Systems and methods are disclosed for parsing resume documents using computer vision and optical character recognition technology in combination with a user feedback interface system to facilitate user feedback to improve the overall processing quality of the resumes that are imported into computer resume processing systems. In selected embodiments, the resume parsing system includes client-facing frontend code that is responsible for facilitating document input and user interaction and feedback, and backend code that stores user data and performs information extraction using computer vision and optical character recognition services to parse, label, and block extracted resume text. In operation, the client-facing frontend code is configured to prompt the user for their resume which is then uploaded to the backend and parsed using the user feedback resume parsing system. In addition, the client-facing frontend code is configured to visually display the initial parsing results to the user, including all detected blocks of text on the resume which are surrounded by an initial set of bounding blocks or boxes. To solicit corrective feedback, the client-facing frontend code is configured to ask the user to select all bounding blocks which relate to a backend generated label. The user will then continue selecting blocks based on the labels the backend has generated until all labels have been assigned. At this point, the user can either create custom labels and annotate their resume further or finalize the import and submit their parsed resume along with the labels they have selected to be imported into the resume parsing system. Through the submission and recording of corrective user feedback of data to re-group the bounding blocks, the resume parsing system is better able to train the computer resume processing systems to prompt for better labels, to better understand resume layouts, and to make it significantly easier for users to import a high quality resume into the resume parsing system.

While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the data processing arts to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as processing, computing, calculating, determining, displaying or the like, refer to the action and processes of a computer system, or similar electronic computing device, that manipulates and/or transforms data represented as physical, electronic and/or magnetic quantities within the computer system's registers and memories into other data similarly represented as physical quantities within the computer system memories or registers or other such information storage, transmission or display devices.

Referring now to FIG. 1, there is shown a block diagram illustration of a network environment 100 in which resume parsing and reblocking may be practiced in accordance with selected embodiments of the present disclosure. As depicted, the network environment 100 (e.g., a private wide area network (WAN) or the Internet) includes a number of networked server computer systems 104(1)-(N) that are accessible by client computer systems 106(1)-(M), where N is the number of server computer systems connected to the network and M is the number of client computer systems connected to the network. Communication between client computer systems 106(1)-(M) and server computer systems 104(1)-(N) typically occurs over a network 102, such as a public switched telephone network over asynchronous digital subscriber line (ADSL) telephone lines or high-bandwidth trunks, for example communications channels providing T1 or OC3 service. Client computer systems 106(1)-(M) typically access server computer systems 104(1)-(N) through a service provider, such as an internet service provider ("ISP") by executing application specific software, commonly referred to as a browser, on one of client computer systems 106(1)-(M).

Client computer systems 106(1)-(M) and/or server computer systems 104(1)-(N) are programmed to become specialized machines to implement at least some embodiments of the below described systems and method. The specialized computer systems may be, for example, include a mainframe, a mini-computer, a personal computer system including notebook computers, a wireless, mobile computing device (including personal digital assistants, smart phones, and tablet computers), etc. When programmed to implement at least some of the embodiments of the below described systems and method, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. At least some of the embodiments of the below described systems and method can be implemented using code stored in a tangible, non-transient computer readable medium and executed by one or more processors. At least some of the embodiments of the below described systems and method can be implemented completely in hardware using, for example, logic circuits and other circuits including field programmable gate arrays.

In accordance with selected embodiments of the present disclosure, one or more of the client computer systems (e.g., 106(1)-106(8)) may be used by a job seeker or applicant to communicate over a network, such as the Internet 102, with a job search system which may be hosted on one or more server computer systems (e.g., 104(1)-(2)) and/or client computer systems (e.g., 106(9)-(M)). For example, a user (e.g., job-seeker) may use an electronic device 106(1) to communicate with a client computer system 106(M) which hosts a client job-search application. In turn, the client computer system 106(M) may communicate over the network 102 with a server computer system 104(1) which hosts a resume parsing and re-blocking engine 101. As depicted, resume parsing and re-blocking engine 101 includes a user interface/feedback front end module 120 that is responsible for providing a user interface (UI) to facilitate document input and user interaction and feedback. In addition, the resume parsing and re-blocking engine 101 includes a back end module 110 that performs information extraction using computer vision processing module 111 and optical character recognition (OCR) module 112 to parse, label, and block extracted resume text. In operation, the jobseeker uses the electronic device 106(1) to upload a resume to the resume parsing and re-blocking engine 101 under control of the front end module 120. The uploaded resume is then processed at the back end module 110 to generate initial parsing results which are stored as the original blocking data 113 which includes all detected blocks of text on the resume along with an initial set of bounding blocks surrounding the detected text blocks. In addition, the front end module 120 solicits corrective feedback by visually displaying the initial parsing results to the user and prompting the user to select all bounding blocks which relate to a backend generated label. This sequence of user feedback is iteratively repeated until the user selects and regroups bounding blocks for all backend generated labels, at which point the back end module 110 stores the final parsing results as the regrouped blocking data 114 which includes all detected blocks of text on the resume which are surrounded by the regrouped bounding blocks.

Figure 2:
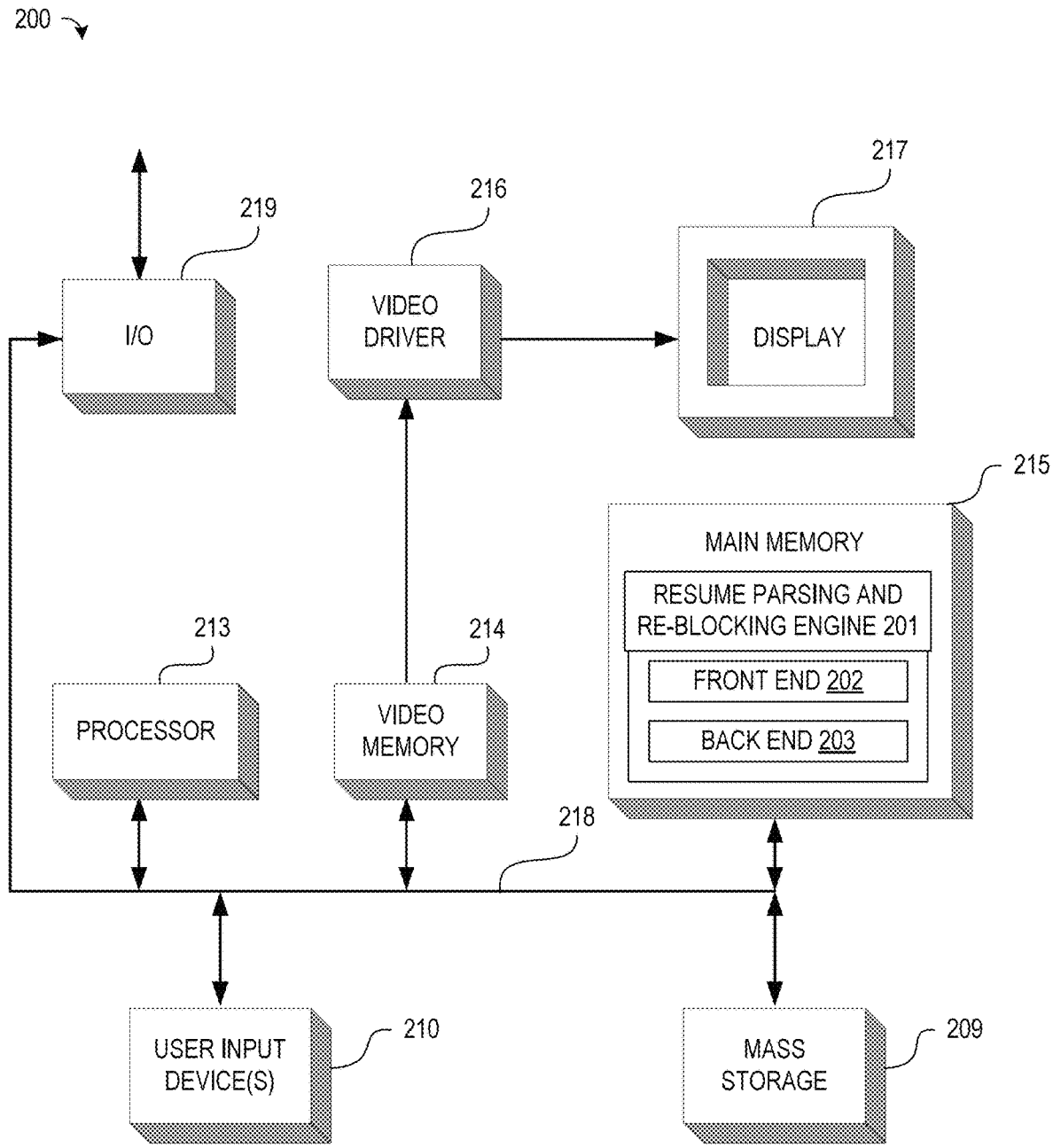
FIG. 2 is a block diagram of a computer system suitable for implementing the resume parsing and reblocking engine in accordance with selected embodiments of the present disclosure.

Referring now to FIG. 2, there is shown a block diagram illustration of an exemplary specialized computer system 200 suitable for implementing the resume parsing and reblocking engine 201 in accordance with selected embodiments of the present disclosure for supporting a job-search system. As will be appreciated, the computer system 200 can be a dedicated computer system or a virtual, emulated system located in, for example, a cloud computing environment. The depicted computer system 200 includes input user device(s) 210, such as a keyboard and/or mouse, which are coupled to a bi-directional system bus 218. The input user device(s) 210 are provided for receiving user input to the computer system and communicating that user input to processor 213. The computer system 200 also includes a non-transitory video memory 214, non-transitory main memory 215, and non-transitory mass storage 209, all coupled to bi-directional system bus 218 along with input user device(s) 210 and processor 213. The mass storage 209 may include both fixed and removable media, such as a hard drive, one or more CDs or DVDs, solid state memory including flash memory, and other available mass storage technology. Bus 218 may contain, for example, 32 of 64 address lines for addressing video memory 214 or main memory 215. The system bus 218 also includes, for example, an n-bit data bus for transferring DATA between and among the components, such as CPU/processor 213, main memory 215, video memory 214, and mass storage 209, where "n" is, for example, 32 or 64. Alternatively, multiplex data/address lines may be used instead of separate data and address lines.

The depicted computer system 200 also includes and I/O interface 219 that provide connections to peripheral devices, such as a printer, and may also provide a direct connection to a remote server computer system via a telephone link or to the Internet via an ISP. I/O interface 219 may also include a network interface device to provide a direct connection to a remote server computer system via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O interface devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory (e.g., mass storage 209) into main memory 215 for execution. Computer programs may also be in the form of electronic signals modulated in accordance with the computer program and data communication technology when transferred via a network.

In selected embodiments, the processor 213 is a microprocessor manufactured by Motorola Inc. of Illinois, Intel Corporation of California, or Advanced Micro Devices of California. However, any other suitable single or multiple microprocessors or microcomputers may be utilized. Main memory 215 may be constructed with dynamic random access memory (DRAM). Video memory 214 is a dual-ported video random access memory. One port of the video memory 214 is coupled to video driver 216. The video driver 216 is used to drive the display 217. Video driver 216 is well known in the art and may be implemented by any suitable circuitry for converting data stored in video memory 214 to a signal suitable for use by display 217. Display 217 is a type of monitor suitable for displaying graphic images.

The computer system described above is for purposes of example only. It is contemplated that at least some of the embodiments of the below described systems and method might be run on a stand-alone computer system, such as the one described above. At least some of the embodiments of the below described systems and method might also be run from a server computer systems system that can be accessed by a plurality of client computer systems interconnected over an intranet network. Finally, at least some of the embodiments of the below described systems and method may be run from a server computer system that is accessible to clients over the Internet.

Many other devices or subsystems (not shown) may be connected in a similar manner (e.g., document scanners, digital cameras and so on). Conversely, all of the devices shown in FIG. 2 need not be present to practice the systems described herein. The devices and subsystems can be interconnected in different ways from that shown in FIG. 2. Code to implement portions of the systems described herein can be stored in computer-readable storage media such as one or more of system memory 215 and/or mass storage 209. The operating system provided on computer system 200 may be WINDOWS, UNIX, LINUX, IOS, or another operating system. To this end, system memory 215 is depicted in FIG. 2 as storing code implementing a resume parsing and re-blocking engine 210 having a front module 202 and back end module 203 in the manner discussed herein.

Figure 3:
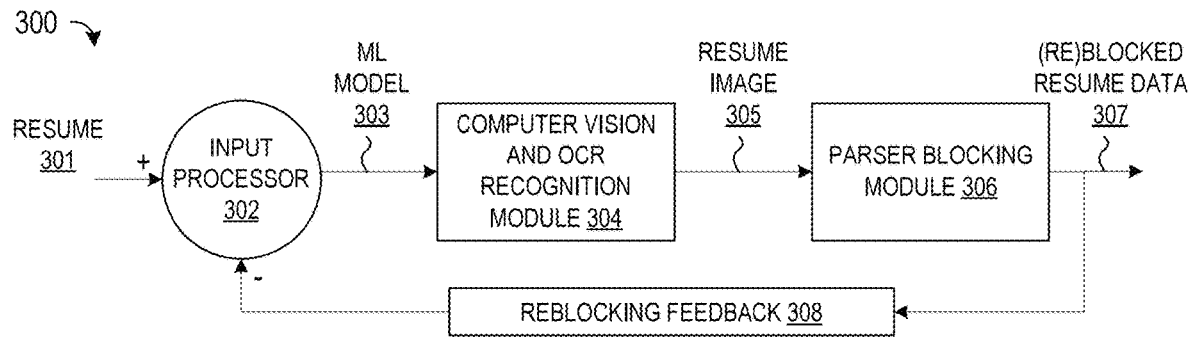
FIG. 3 illustrates a state machine expression for parsing resumes with user feedback in accordance with selected embodiments of the present disclosure.

Referring now to FIG. 3, there is shown a simplified state machine expression 300 for parsing resumes with user feedback in accordance with selected embodiments of the present disclosure for supporting a job-search system. Generally speaking, the depicted state machine expression 300 receives an input resume 301 at an input processing node 302 which uses an information extraction service to automatically extract structured information from the input resume 301. In an example embodiment, the input processing node 302 invokes a third party API, such as Google's Cloud Vision API, to generate the machine learning model output 303 which is processed by the computer vision and OCR recognition module 304 to output resume image data 305, such as a pdf/doc file. In the first pass, a parser blocking module 306 receives and processes the resume image data 305 to generate initial resume data by parsing the text from the resume image 305 to identify text blocks (e.g., two-dimensional or multi-line text passages) and to generate initial bounding blocks around the identified text blocks. However, in order to correct errors in the initial resume data, the depicted state machine expression 300 includes a reblocking feedback loop 308 between the parsing blocking module 306 and the input processor node 302 so that the user can provide corrective user feedback of data to re-group the bounding blocks. At the input processor node 302, the user feedback is incorporated into the information extraction service (e.g., the "negative" or corrective input) to update the machine learning model output 303. For example, the reblocking feedback loop 308 may be iteratively invoked for each of a plurality off backend labels generated for predetermined resume sections and/or fields. To facilitate the user reblocking feedback, the frontend module may use section/field buttons and/or hot key inputs in a user interface to facilitate user feedback for regrouping initial bounding blocks.

Figure 4:
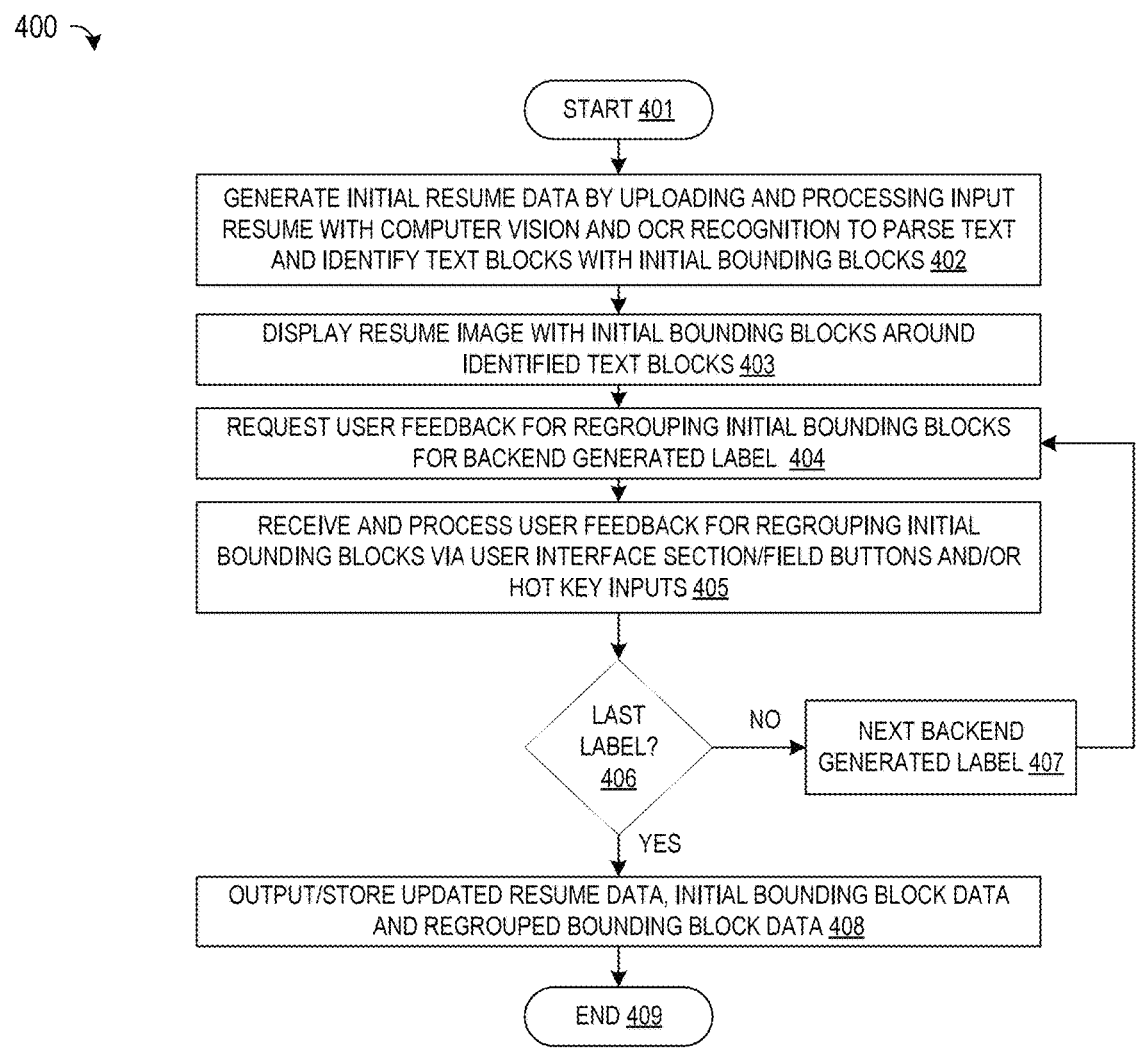
FIG. 4 shows a flowchart depicting a method for parsing resumes with user feedback in accordance with selected embodiments of the present disclosure.

As disclosed herein, selected embodiments of the present disclosure may be implemented as a method or sequence of steps which are used to parse resumes with user feedback corrections to re-group an initial set of bounding blocks around identified text blocks. For example, reference is now made to FIG. 4 which shows a flowchart 400 depicting a method for parsing resumes with user feedback in accordance with selected embodiments of the present disclosure. As disclosed herein, the method may be implemented with a computer apparatus, system, and/or computer program product containing computer program instructions which implement the resume parsing and re-blocking functionality. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Once the method starts (step 401), an input resume is processed to generate initial resume data by uploading and processing the input resume with computer vision and OCR recognition to parse text and identify text blocks with initial bounding blocks (step 402). As disclosed herein, the input resume processing may be implemented by a combination of client-facing frontend code (which is executed to facilitate document input and user interaction and feedback) and backend code (which is executed to perform information extraction to parse, label, and block extracted resume text). For example, the backend code may invoke a third party information extraction API, such as Google's Cloud Vision API, to generate the initial resume data using a two-pass IE framework. In the first pass, the general information is extracted by segmenting the entire resume into consecutive or sequential text sequences which are analyzed and grouped into blocks which are each annotated with a label indicating its category. In the second pass, initial bounding blocks are generated around each block of text sequences, where each initial bounding block is specified with a x-y starting coordinates and width dimensions. Due to limitations on the accuracy of information extraction service and/or unusual formatting layouts of the original input resume, there can be errors in the association of bounding blocks with the identified text blocks. For example, multiple text blocks belonging to a single logical section or field of extracted/parsed text may be incorrectly identified in separate text blocks and/or associated with separate bounding blocks. In this initial iteration of the method at step 402, these errors are included in the initial resume data.

At step 403, the initial resume data is processed to generate and display a resume image which includes the initial bounding blocks around the identified text blocks. As disclosed herein, the image display processing at step 403 may be implemented by the client-facing frontend code which is configured to generate a user interface which includes the initial resume data along with a display control panel which includes user control and feedback buttons and/or fields. In selected embodiments, the resume image is generated as a pdf/doc file that is then displayed to the user in the user interface. At this point in the methodology, any errors in the identification of text blocks and initial bounding blocks from step 402 are included in the resume image displayed at step 403.

At step 404, the user is requested to provide feedback for regrouping the initial bounding blocks for a backend generated label. As disclosed herein, the user feedback request processing may be implemented by the client-facing frontend code which is configured to display control and feedback buttons and/or fields in the user interface which prompts the user to select all bounding blocks which relate to a backend generated label. As will be appreciated, the user interface may include a copy of the resume image, along with a set of interface buttons and/or hot key commands which can be activated by the user to provide corrective feedback by regrouping the initial bounding blocks shown in the resume image into a single bounding block which is associated with the backend generated label.

At step 405, the user feedback is received and processed to regroup one or more of the initial bounding blocks. As disclosed herein, the user feedback may be implemented by the client-facing frontend code which is configured to provide display control and feedback buttons and/or fields in the user interface which enable the user to visually see all detected blocks of text on their resume as bounding blocks, and which prompt the user to select all bounding blocks which relate to a backend generated label. The user feedback for regrouping the bounding blocks may be provided when the user manipulates the screen cursor in the user interface to select a plurality of initial bounding blocks by creating a bounding box in the screen which surrounds the initial bounding blocks which are correctly associated with the backend generated label. The user interface may also include a set of labeling buttons or options to allow the user to relabel the regrouped bounding blocks with a new label and to confirm the regrouping and/or relabeling.

At step 406, the method determines if all backend generated labels for the input resume have been processed. If not (negative outcome to decision step 406), then the next backend generated label is selected at step 407, and the method returns to step 404 to request user feedback for regrouping the initial bounding blocks for the new backend generated label. As disclosed herein, the processing to generate the next label may be implemented by the backend code which sequences through a listing of resume labels for sections and/or fields (e.g., Contact, Name, Email, Location, Summary, Header, References, etc.).

Once all of the backend generated labels have been processed for regrouping (affirmative outcome to decision step 406), then the updated resume data is output and/or stored along with the initial bounding block data and regrouped bounding block data at step 408. As disclosed herein, the output and storage processing may be implemented by a combination of client-facing frontend code and backend code which are configured to store and/or display the updated resume data that includes any regrouped bounding blocks along with updated labels provided through user feedback. In addition, the storage of the initial and regrouped bounding block data may be implemented by the backend code which is configured to store regrouped block data to identify the regrouped bounding block(s) and associated text sequences, where each regrouped bounding block is specified with a x-y starting coordinates and width dimensions. Once stored, the updated resume data, initial bounding block data, and regrouped bounding block data may be used as training data to improve the ability of the resume processing system to accurately parse text and identify text blocks with initial bounding blocks.

Figure 5:
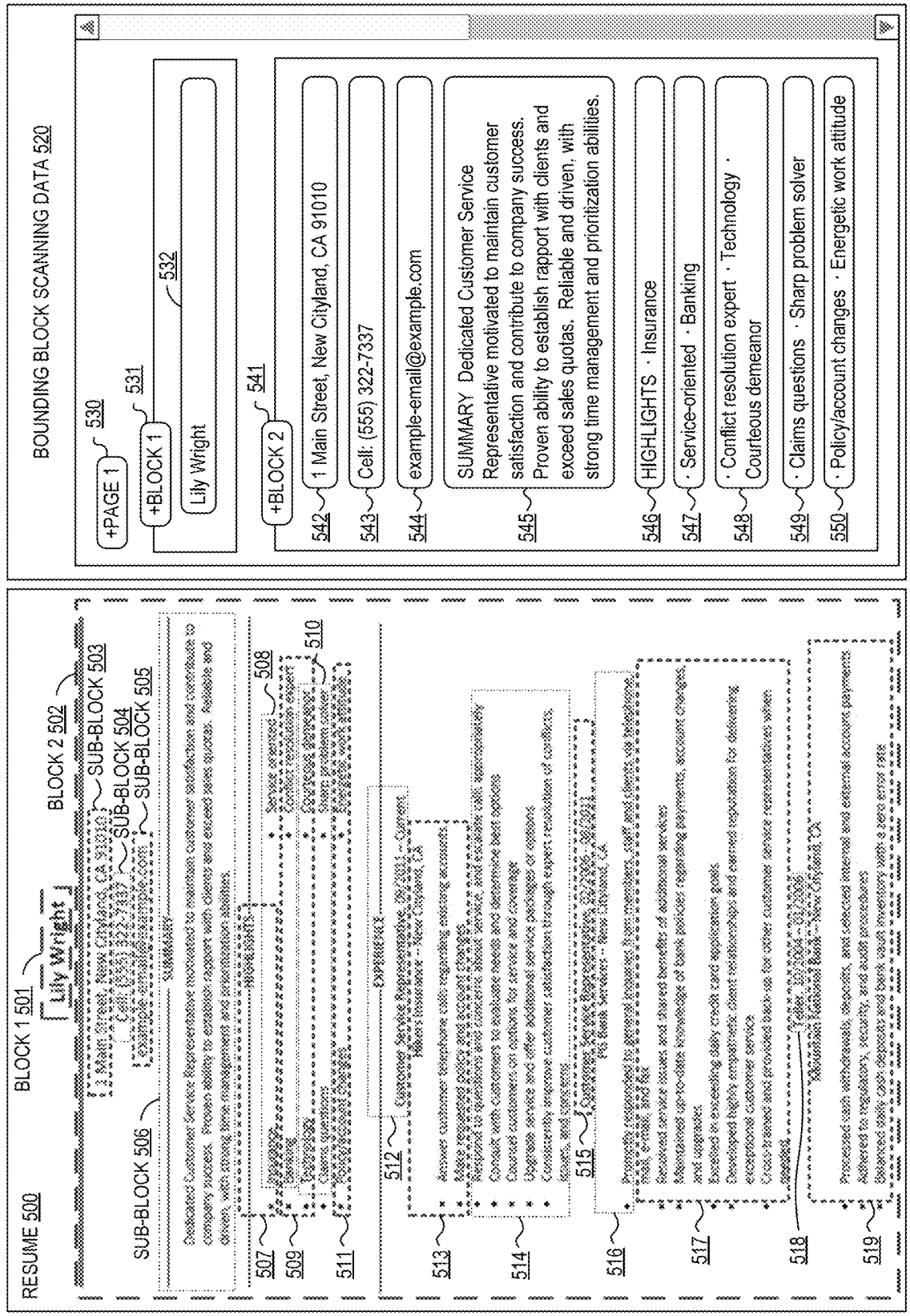
FIG. 5 shows an input resume and corresponding initial bounding block scanning data after processing the resume with a computer vision and OCR recognition service to initially identify bounding blocks for parsed text blocks in accordance with selected embodiments of the present disclosure.

To provide additional details for an improved understanding of the present disclosure, reference is now made to FIG. 5 which shows an input resume 500 and corresponding initial bounding block scanning data 520 after processing the resume 500 to initially identify bounding blocks 501-519 for parsed text blocks in the resume 500. In this example, the input resume 500 for a job applicant (Lily Wright) is uploaded and processed with a computer vision and OCR recognition service, such as the Google Vision API, to parse and extract text blocks and to identify bounding blocks 501-519 around the extracted text blocks. The initial parsing and bounding block analysis of the resume 500 is reflected in the initial bounding block scanning data 520 which shows a hierarchical structure of the first page 530 with two main blocks, Block 1 531 and Block 2 541. As depicted, the first block 531 corresponds to the bounding block 501 on the resume 500 and includes a sub-block 532 for the resume name field. In addition, the second block 541 corresponds to the bounding block 502 on the resume 500 and includes multiple sub-blocks 542-550 which correspond, respectively, to the bounding blocks 503-511.

Due to limitations of the computer vision and OCR recognition service which has difficulty processing resume layout formats, the initial bounding block grouping of text may be inaccurate. For example, the first bounding block 501 on the first page of the resume 500 is correctly associated with the name of the job applicant (Lily Wright). However, the second bounding block 502 is overbroadly associated with the remaining extracted text on the first page, improperly combining sub-sections (e.g., Summary, Highlights, Experience) into a single grouping. In addition, the sub-blocks or fields are not always correctly associated with extracted text. For example, the bounding sub-blocks 503-505 are correctly and separately associated with parsed text blocks for the job seeker's address, cellphone, and email information, but there is no indication that these sub-blocks belong to a "contact" field for the resume. In addition, the sub-block 506 is correctly associated with the "summary" of the job applicant. However, the identified sub-blocks 507-511 incorrectly separate the parsed text blocks for the "highlights" section of the resume into multiple bounding blocks which are not correctly labeled as a single, logically-connected section. The separate bounding blocks 507-511 are shown in the initial bounding block scanning data 520 with the separate sub-blocks 546-550 without including any connecting label or association. Though not shown in the visible window portion of the initial bounding block scanning data 520, there are addition errors in the initial bounding blocks 512-519, including separated bounding blocks 512-514 which properly belong to a single work experience entry with "Hiker's Insurance." Similarly, there are separate bounding blocks 515-517 which properly belong to a single work experience entry with "PG Bank Services," and separate bounding blocks 518-519 which properly belong to a single work experience entry with "Mountain National Bank."

In order to correct errors in the initial bounding block grouping, user feedback is solicited to facilitate corrective user feedback, such as by generating a user interface to request user feedback in regrouping the initial bounding blocks. To provide additional details for an improved understanding of selected embodiments of the present disclosure, reference is now made to FIGS. 6A-D which show a sequence of user interface screen shots 600A-D which illustrate a reblocking sequence for providing user feedback on a scanned/parsed input resume in accordance with selected embodiments of the present disclosure. Each of the depicted user interface screen shots includes a center image panel 602 which displays the input resume image with the initial bounding blocks indicated in blue dashed lines.

Each depicted user interface screen shot also 600A-D includes a left control panel 601 with an array of predetermined UI section/field buttons for labelling and/or grouping bounding blocks around the text blocks. While any suitable arrangement of buttons may be included, the left control panel 601 may include a first set of section coverage buttons 601A which are each identified with a hotkey shortcut label and a corresponding label name that is displayed next to the section button. For example, a first section button is identified by the adjacent name "Grp" so that, when the user selects bounding blocks in the central image panel 602 and then clicks or activates the first section button, the selected bounding blocks are regrouped and labeled with the section label "Grp." In addition or in the alternative, the first section button may be labeled with the hotkey name "4" so that, by pressing the "4" key on the keyboard after selecting bounding blocks on the central image panel 602, the selected bounding blocks are regrouped and labeled with the section label "Grp." The same labeling functionality may be provided for the other section keys (e.g., "Pat", "Pub", "Mac", etc.) in the first set of section buttons 601A. In similar fashion, the left control panel 601 may include a second set of item coverage buttons 601B and/or a third set of field coverage buttons 601C, each of which include one or more buttons which are identified by an adjacent name (e.g., "Eml") and hotkey name (e.g., "2") so that, when the user selects bounding blocks in the central image panel 602 and then clicks or activates the button, the selected bounding blocks are regrouped and labeled with the corresponding label name.

In addition, each depicted user interface screen shot includes one or more right status panels 603, 604. In selected embodiments, a first status panel 603 may include interface control buttons or toggles to control how information is displayed in the central display panel 602. For example, first toggle button is provided to invert the resume colors displayed in the central display panel 602. In addition or in the alternative, a second toggle button is provided to hide annotation labels from being displayed in the central display panel 602. In addition, a second status panel 604 may include interface control buttons to enable the user to confirm ("Confirm") or skip ("Skip") a selected boundary regrouping and/or relabeling operation. The second status panel 604 may also include a status block to show which text or blocks have been selected by a user's regrouping selection in the central display panel 602.

With this understanding of the arrangement and layout of the user interface screen shots 600A-D, there will now be described an example sequence of user feedback interactions to illustrate a reblocking sequence for providing user feedback on a scanned/parsed input resume. Starting first with FIG. 6A, the depicted user interface screen shot 600A includes a center panel 602A (with the input resume image from FIG. 5 with the initial bounding blocks in blue dashed lines), a left panel 601A-C (with UI section/field buttons for labelling bounding boxes), and a right panel 603-604 (for identifying and confirming text/block selection). In the depicted screen shot 600A, the user feedback has regrouped the bounding blocks 501 and 503-505 for the "Contact" section with the cursor-selected bounding box 605. As a result of the user selection of bounding blocks 501, 503-505, the right panel field 604A displays the text blocks which are encompassed by the user-selected bounding blocks, and the user can confirm or skip this selection by clicking on the "Confirm" or "Skip" buttons.

Figure 6A:
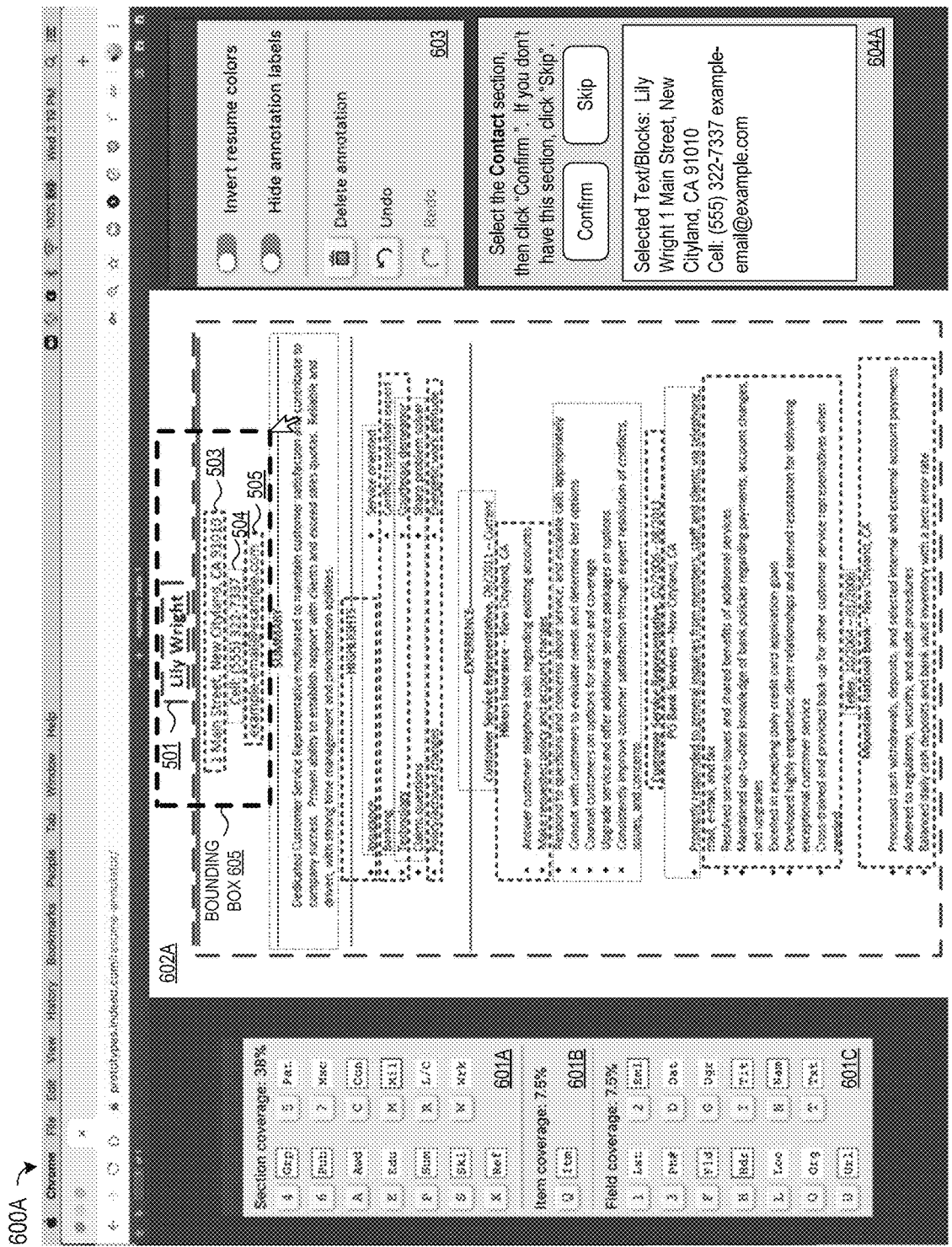
FIGS. 6A-D show a sequence of user interface screen shots illustrating a reblocking sequence for providing user feedback on a scanned/parsed input resume in accordance with selected embodiments of the present disclosure.
Figure 6B:
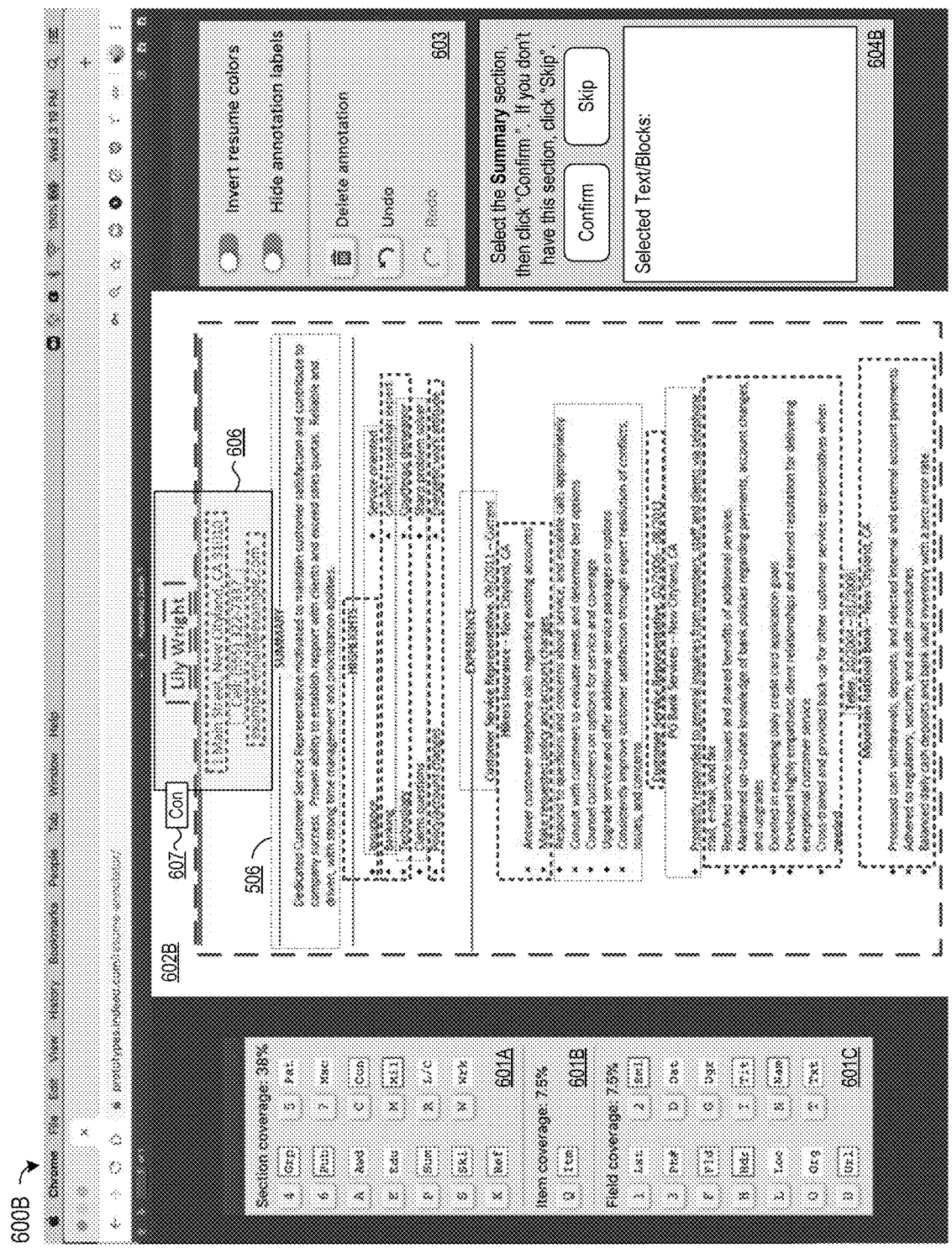

Turning now to the user interface screen shot 600B shown in FIG. 6B, the UI center display panel 602B shows the input resume image (from FIG. 5) after the user confirmed the regrouping of bounding blocks shown in FIG. 6A. In particular, the UI center display panel 602B displays the regrouped bounding block 606 (from FIG. 6A) superimposed over the resume image. In addition, the UI center display panel 602B may display a user-selected label 607 (e.g., "Con") which is created by clicking the "Con" button on the first set of field coverage buttons from the left UI panel 601A, or by pressing the "C" key on the keyboard after a text block is selected. In this way, the user feedback is provided to regroup the bounding blocks 501, 503-505 into a single regrouped bounding block 606 and label 607.

In the user interface screen shot 600B shown in FIG. 6B, the right panel field 604B is prompting the user to provide feedback for the "Summary" section. In this example, there is no regrouping required since the initial bounding block 506 for the "Summary" section was correct. Accordingly, the user can skip this prompt or can select the desired bounding blocks and provide a corresponding label using the options provided by the array of predetermined UI section/field buttons in the left control panel 601A-C.

Figure 6C:
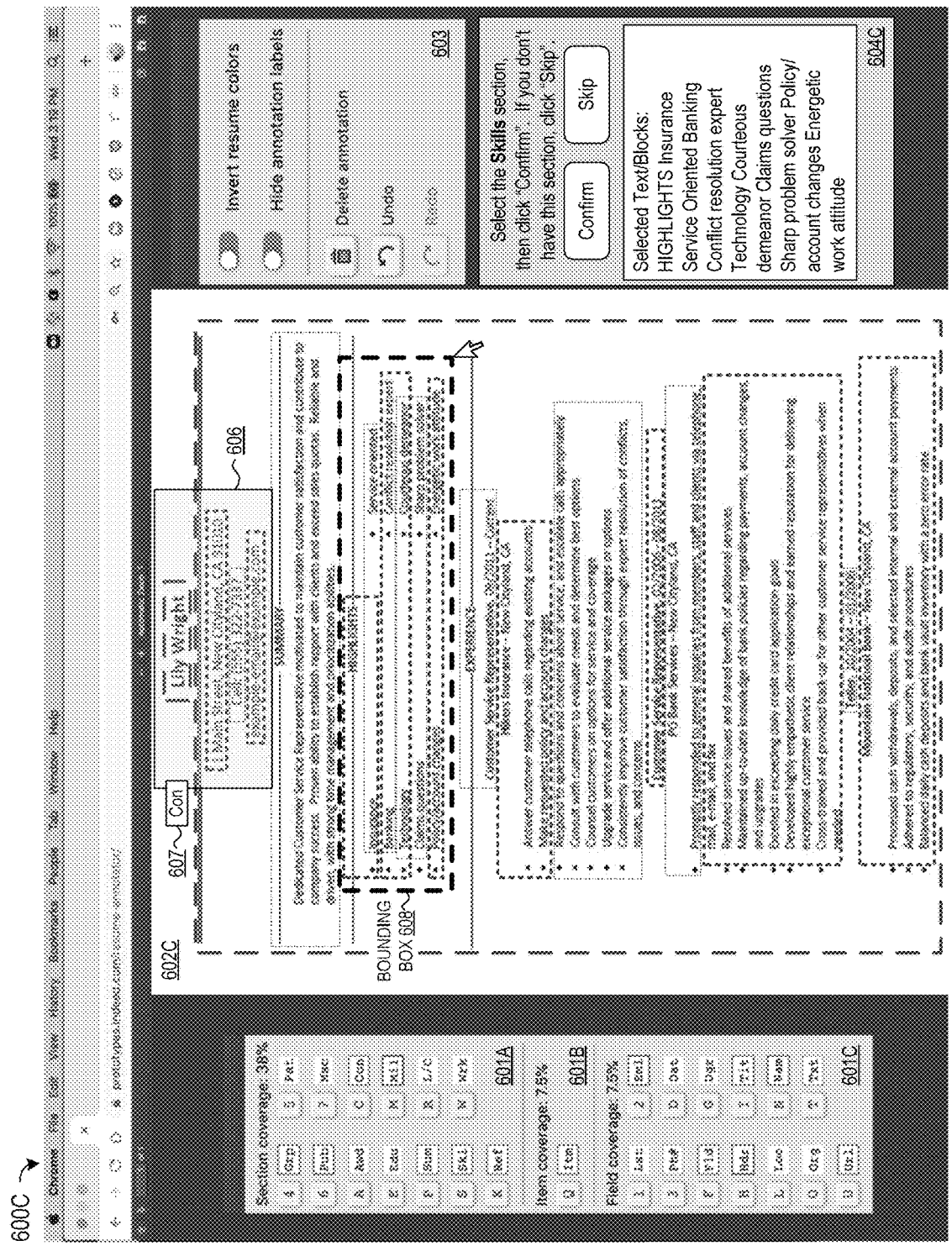

Turning now to the user interface screen shot 600C shown in FIG. 6C, the user feedback has regrouped the bounding blocks 507-511 (from FIG. 5) for the "Skills" section with the cursor-selected bounding box 608. As a result of the user selection of bounding blocks 507-511, the right panel field 604C displays the text blocks which are encompassed by the user-selected bounding blocks, and the user can confirm or skip this selection by clicking on the "Confirm" or "Skip" buttons.

Figure 6D:
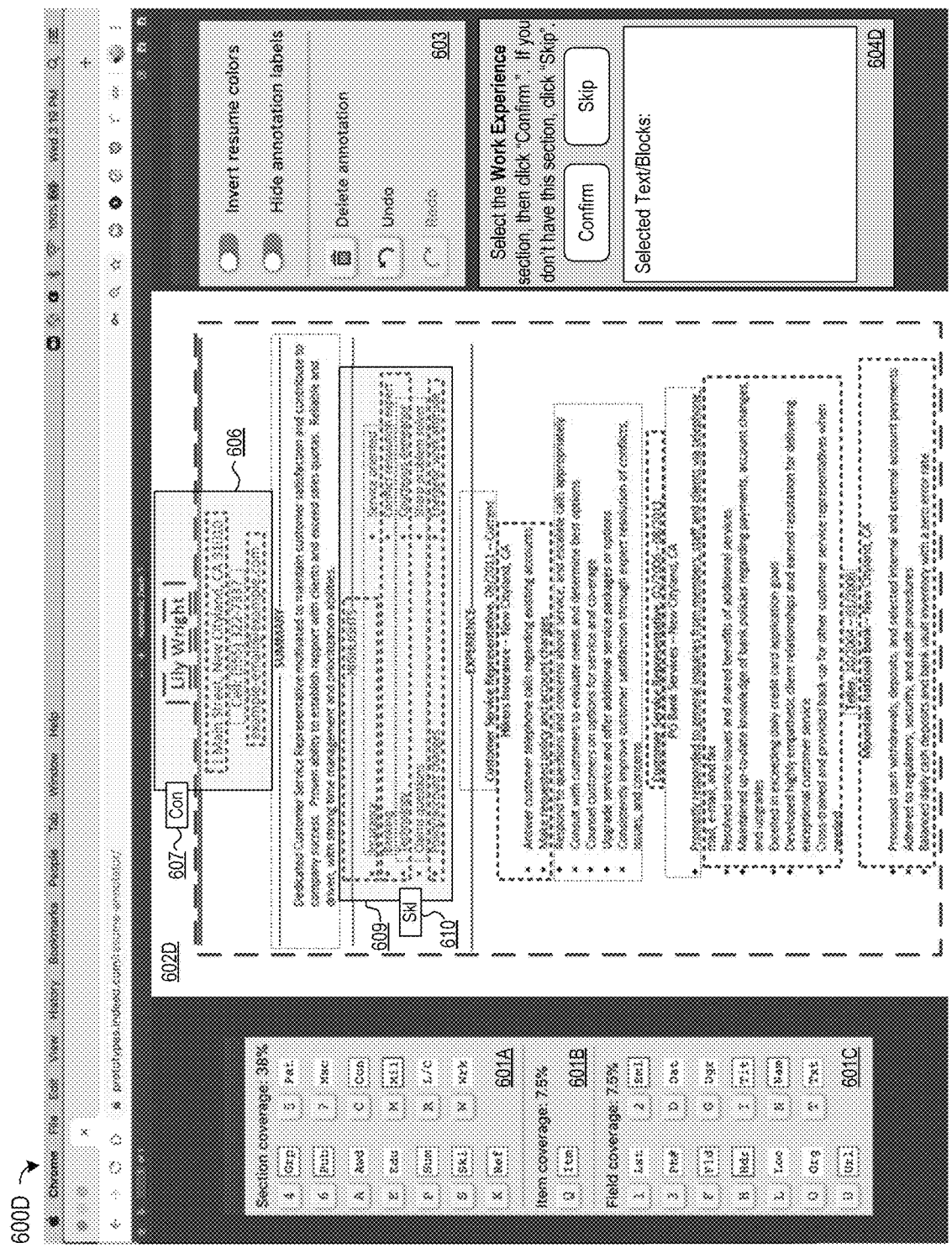

Turning now to the user interface screen shot 600D shown in FIG. 6D, the UI center display panel 602D shows the input resume image (from FIG. 5) after the user confirmed the regrouping of bounding blocks shown in FIG. 6C. In particular, the UI center display panel 602D displays the regrouped bounding block 609 (from FIG. 6C) superimposed over the resume image. In addition, the UI center display panel 602D may display a user-selected label 610 (e.g., "Skl") which is created by clicking the "Skl" button on the first set of field coverage buttons from the left UI panel 601A, or by pressing the "S" key on the keyboard after a text block is selected. In this way, the user feedback is provided to regroup the bounding blocks 507-511 into a single regrouped bounding block 609 and label 610.

In the user interface screen shot 600D shown in FIG. 6D, the right panel field 604D is prompting the user to provide feedback for the "Work Experience" section. Though not illustrated, it will be appreciated that the foregoing sequence may be iteratively repeated to provide corrective user feedback for each of the remaining sections and field of the input resume. In particular, the user interface may iteratively regroup bounding blocks for each of a plurality of backend generated labels by using a cursor-selected bounding box to select bounding blocks relating to the label, generating a regrouped bounding block for the selected bounding blocks, labelling the regrouped bounding block, and then confirming the selection and labelling of the regrouped bounding block.

Figure 7:
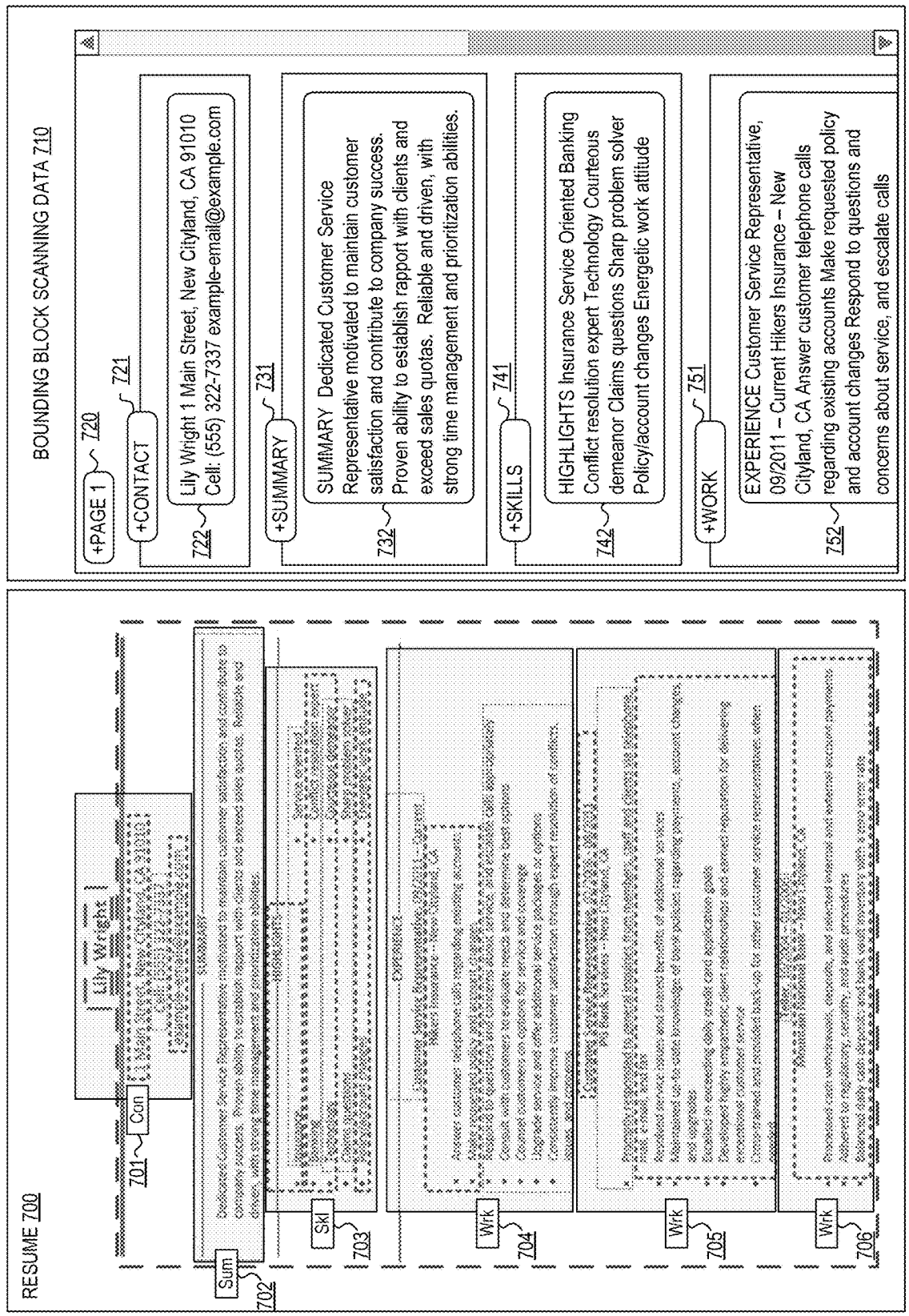
FIG. 7 shows an output resume and corresponding output bounding block scanning data after processing the input resume with user feedback to regroup bounding blocks in accordance with selected embodiments of the present disclosure.

While the corrective feedback from the user will depend on the reblocking and labelling choices made by the user, the final version of the resume data with regrouped bounding blocks will provide for more accurate information extraction from the resume. In addition, the corrected information extraction may be used with a machine learning process to train the resume processing systems to more accurately identify the resume contents. To provide an example illustration of the final feedback results, reference is now made to FIG. 7 which shows an output resume 700 and corresponding output bounding block scanning data 710 after processing the input resume 700 with user feedback to regroup bounding blocks in accordance with selected embodiments of the present disclosure. In this example, the bounding blocks (e.g., 501-519) initially identified in the input resume 700 have been regrouped through corrective user feedback to include a first regrouping block 701 (which combines the initial bounding blocks 501, 503-505) which is identified with the "contact" label (Con), a second regrouping block 702 (which includes the initial bounding block 506) which is identified with the "summary" label (Sum), a third regrouping block 703 (which combines the initial bounding blocks 507-511) which is identified with the "skills" label (Skl), a fourth regrouping block 704 (which combines the initial bounding blocks 512-514) which is identified with the "work" label (Wrk), a fifth regrouping block 705 (which combines the initial bounding blocks 515-517) which is identified with the "work" label (Wrk), and a sixth regrouping block 707 (which combines the initial bounding blocks 518-519) which is identified with the "work" label (Wrk).

In correspondence to the user-corrected parsing and bounding block analysis of the resume 700, the bounding block scanning data 710 includes a hierarchical structure of the first page 720 with multiple main blocks 721, 731, 741, 751, etc. that are identified with labels (e.g., Contact, Summary, Skills, Work) through the user feedback process. As depicted, the first main block 721 corresponds to the first regrouping block 701 (which combines the initial bounding blocks 501, 503-505) and includes the combined text block 722 for the contact field. In addition, the second main block 731 corresponds to the second regrouping block 702 (which includes the initial bounding block 506) and includes the combined text block 732 for the summary field. In addition, the third main block 741 corresponds to the third regrouping block 703 (which combines the initial bounding blocks 507-511) and includes the combined text block 742 for the skills field. And at the bottom of the displayed bounding block scanning data 710, the fourth main block 751 corresponds to the fourth regrouping block 704 (which combines the initial bounding blocks 512-514) and includes the combined text block 752 for the work field.

As seen from the foregoing, the ability to provide corrective user feedback to regroup bounding blocks improvise the functioning of resume processing computer systems to import high quality resumes into a job recommendation service. Another benefit of generating regrouped blocking data, including all detected resume text blocks and user-corrected regrouped blocking blocks, is that it can be stored along with the original blocking data (which includes all the detected resume text blocks and initial set of bounding blocks) to generate training data for implementing machine learning at resume processing computer system machines and processes which are configured to develop neural network training data and provide artificial intelligence to recognize and label resume input information for use in providing job recommendations to job seekers. In at least one embodiment, an artificial intelligence (AI) resume processing computer system and method implement neural network machine learning by generating and utilizing actual and synthetic training data to identify, extract, block, and label job applicant information from input resume documents to improve job recommendations. For example, the AI job resume processing computer system can learn and intelligently identify job applicant information from a variety of different resume formats and layouts by correctly identifying and bounding multiple-line text blocks belonging to a resume section or field label. The broad concept of machine learning relates to training machine systems and processes to make decisions based on processes that improve over time. The artificial intelligence resume processing computer system and methods represent technological advances that, for example, identify and parse text blocks in a block or group of blocks, identify labels that correctly identify the block(s), develop training data from subsets and/or supersets of the regrouped blocking data and original blocking data, creating a vector-space representation of the training data (e.g., a directed graph), and apply machine learning algorithms to technologically advance and transform a machine into a specialized machine that learns and improves resume processing across the vector space. By using the present disclosure to generate training data through user-corrected feedback for regrouping bounding blocks, the job recommendation and/or resume parsing systems can "learn" to recognize different layout aspects from input resume or job description documents, such as text density, geometric or logical layout, separator detection, neighboring areas, section titles, statistical dependencies between the words, etc.

The present invention may be a system, a method, and/or a computer program product such that selected embodiments include software that performs certain tasks. The software discussed herein may include script, batch, or other executable files. The software may be stored on a machine-readable or computer-readable storage medium and is otherwise available to direct the operation of the computer system as described herein and claimed below. In one embodiment, the software uses a local or database memory to implement the data transformation and data structures so as to automatically parsing resume documents using computer vision and optical character recognition technology in combination with a user feedback interface system, thereby facilitating user feedback to improve the overall processing quality of the resumes that are imported into computer resume processing systems. The local or database memory used for storing firmware or hardware modules in accordance with an embodiment of the invention may also include a semiconductor-based memory, which may be permanently, removably or remotely coupled to a microprocessor system. Other new and various types of computer-readable storage media may be used to store the modules discussed herein. Additionally, those skilled in the art will recognize that the separation of functionality into modules is for illustrative purposes. Alternative embodiments may merge the functionality of multiple software modules into a single module or may impose an alternate decomposition of functionality of modules. For example, a software module for calling sub-modules may be decomposed so that each sub-module performs its function and passes control directly to another sub-module.

In addition, selected aspects of the present invention may take the form of an entirely hardware embodiment, an entirely software embodiment (including firmware, resident software, micro-code, etc.), or an embodiment combining software and/or hardware aspects that may all generally be referred to herein as a "circuit," "module" or "system." Furthermore, aspects of the present invention may take the form of computer program product embodied in a computer readable storage medium or media having computer readable program instructions thereon for causing a processor to carry out aspects of the present invention. Thus embodied, the disclosed system, a method, and/or a computer program product is operative to improve the design, functionality and performance of software programs by automatically detecting, detecting, parsing, and grouping resume text blocks in an input resume document.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage d device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Visual Basic.net, Ruby, Smalltalk, C++ or the like, and conventional procedural programming languages, such as the "C" programming language, Hypertext Precursor (PHP), or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a sub-system, module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system described above is for purposes of example only and may be implemented in any type of computer system or programming or processing environment, or in a computer program, alone or in conjunction with hardware. Various embodiments of the present may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. The system and method for facilitating document input and user interaction and feedback may be implemented in any type of resume parsing computer system or programming or processing environment. It is contemplated that the resume parsing system and method might be run on a stand-alone computer system, such as the one described above. The resume parsing system and method might also be run from a server computer systems system that can be accessed by a plurality of client computer systems interconnected over an intranet network. Finally, the resume parsing system and method may be run from a server computer system that is accessible to clients over the Internet.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The disclosed system is well adapted to attain the advantages mentioned as well as others inherent therein. While the disclosed system has been depicted, described, and is defined by reference to particular embodiments, such references do not imply a limitation on the scope of the disclosure, and no such limitation is to be inferred. The disclosed system is capable of considerable modification, alteration, and equivalents in form and function, as will occur to those ordinarily skilled in the pertinent arts. The depicted and described embodiments are examples only and are not exhaustive of the scope of the teachings of the present application.

What is claimed is:

1. A computer-implemented method, comprising:
    prompting a user with frontend code to upload an input resume document;
    performing a first parsing pass of the input resume document with backend code to generate initial resume data by extracting a plurality of resume text blocks and identifying an initial set of bounding blocks, wherein each bounding block of the initial set of bounding blocks surrounds a corresponding resume text block;
    visually displaying, by frontend code, the initial resume data to a screen for user review of the initial set of bounding blocks;
    processing all of a plurality of backend generated labels against the initial resume data, including:
        prompting the user with frontend code to select one or more bounding blocks of the initial set of bounding blocks that correspond to a backend generated label via a screen cursor configured for user manipulation to create a bounding box surrounding the one or more bounding blocks on the screen;
        regrouping the one or more bounding blocks within the bounding box into a regrouped bounding block;
        consolidating, into a regrouped text block, each of the resume text blocks corresponding to the regrouped bounding block;
        prompting the user with frontend code to relabel resume text blocks surrounded by one or more other bounding blocks of the initial set of bounding blocks using a new label created by the user; and
        determining that all of the plurality of backend generated labels have been processed; and
    based on the determination that all of the plurality of backend generated labels have been processed, storing, in memory, regrouped bounding block data identifying the regrouped bounding block, the regrouped text block, and the new label.

2. The computer-implemented method of claim 1, wherein performing the first parsing pass comprises invoking a computer vision and optical character recognition extraction service to automatically extract structed information from the input resume document.

3. The computer-implemented method of claim 1, wherein the resume text blocks surrounded by the one or more bounding blocks are located on different lines of the input resume document.

4. The computer-implemented method of claim 1, wherein visually displaying the input resume document comprises generating and displaying a user interface display screen which displays, to the user, the input resume document with the initial set of bounding blocks and the corresponding resume text blocks.

5. The computer-implemented method of claim 4, wherein prompting the user with frontend code to select the one or more bounding blocks comprises generating and displaying a display control panel which includes user control and feedback for selecting and grouping the one or more bounding blocks into the regrouped bounding block.

6. The computer-implemented method of claim 5, wherein prompting the user with frontend code to create the new label comprises generating and displaying a display control panel which includes user control and feedback buttons and/or fields for labelling the regrouped bounding block.

7. The computer-implemented method of claim 1, further comprising storing training data comprising the regrouped bounding block data and original bounding block data identifying the initial set of bounding blocks and the corresponding resume text blocks.

8. A computer readable storage medium comprising instructions executable by one or more processors to cause the one or more processors to perform operations, the operations comprising:
    prompting a user with frontend code to upload an input resume document;
    performing a first parsing pass of the input resume document with backend code to generate initial resume data by extracting a plurality of resume text blocks and identifying an initial set of bounding blocks, wherein each bounding block of the initial set of bounding blocks surrounds a corresponding resume text block;
    visually displaying, by frontend code, the initial resume data to a screen for user review of the initial set of bounding blocks;
    processing all of a plurality of backend generated labels against the initial resume data, including:
        prompting the user with frontend code to select one or more bounding blocks of the initial set of bounding blocks that correspond to a backend generated label via a screen cursor configured for user manipulation to create a bounding box surrounding the one or more bounding blocks on the screen;
        regrouping the one or more bounding blocks within the bounding box into a regrouped bounding block;
        consolidating, into a regrouped text block, each of the resume text blocks corresponding to the regrouped bounding block;
        prompting the user with frontend code to create relabel resume text blocks surrounded by one or more other bounding blocks of the initial set of bounding blocks using a new label created by the user; and
        determining that all of the plurality of backend generated labels have been processed; and based on the determination that all of the plurality of backend generated labels have been processed, storing, in memory, regrouped bounding block data identifying the regrouped bounding block, the regrouped text block, and the new label.

9. The computer readable storage medium of claim 8, wherein performing the first parsing pass comprises invoking a computer vision and optical character recognition extraction service to automatically extract structed information from the input resume document.

10. The computer readable storage medium of claim 8, wherein the resume text blocks surrounded by the one or more bounding blocks are located on different lines of the input resume document.

11. The computer readable storage medium of claim 8, wherein visually displaying the input resume document comprises generating and displaying a user interface display screen which displays, to the user, the input resume document with the initial set of bounding blocks and the corresponding resume text blocks.

12. The computer readable storage medium of claim 11, wherein prompting the user with frontend code to select the one or more bounding blocks comprises generating and displaying a display control panel which includes user control and feedback for selecting and grouping the one or more bounding blocks into the regrouped bounding block.

13. The computer readable storage medium of claim 12, wherein prompting the user with frontend code to create the new label comprises generating and displaying a display control panel which includes user control and feedback buttons and/or fields for labelling the regrouped bounding block.

14. The computer readable storage medium of claim 8, further comprising executable instructions and data which, when executed by at least one processing device, cause the at least one processing device to store training data comprising the regrouped bounding block data and original bounding block data identifying the initial set of bounding blocks and the corresponding resume text blocks.

15. A system, comprising:
one or more processors; and
a memory storing instructions executable by the at least one of the one or more processors to:
prompt a user with frontend code to upload an input document;
perform a first parsing pass of the input document with backend code to generate initial data by extracting a plurality of text blocks and identifying an initial set of bounding blocks, wherein each bounding block of the initial set of bounding blocks surrounds a corresponding text block;
visually display, by frontend code, the initial data to a screen for user review of the initial set of bounding blocks;
process all of a plurality of backend generated labels against the initial data, including:
prompting the user with frontend code to select one or more bounding blocks of the initial set of bounding blocks that correspond to a backend generated label via a screen cursor configured for user manipulation to create a bounding box surrounding the one or more bounding blocks on the screen:
regrouping the one or more bounding blocks within the bounding box into a regrouped bounding block;
consolidating, into a regrouped text block, each of the text blocks corresponding to the regrouped bounding block;
prompting the user with frontend code to relabel resume text blocks surrounded by one or more other bounding blocks of the initial set of bounding blocks using a new label created by the user; and
determining that all of the plurality of backend generated labels have been processed; and
based on the determination that all of the plurality of backend generated labels have been processed, store, in memory, regrouped bounding block data identifying the regrouped bounding block, the regrouped text block, and the new label.

16. The system of claim 15, wherein performing the first parsing pass comprises invoking a computer vision and optical character recognition extraction service to automatically extract structed information from the input document.

17. The system of claim 15, wherein the text blocks surrounded by the one or more bounding blocks are located on different lines of the input document.

18. The system of claim 15, wherein visually displaying the input document comprises generating and displaying a user interface display screen which displays, to the user, the input document with the initial set of bounding blocks and the corresponding text blocks.

19. The system of claim 18, wherein prompting the user with frontend code to select the one or more bounding blocks comprises generating and displaying a display control panel which includes user control and feedback for selecting and grouping the one or more bounding blocks into the regrouped bounding block.

20. The system of claim 19, wherein prompting the user with frontend code to create the new label comprises generating and displaying a display control panel which includes user control and feedback buttons and/or fields for labelling the regrouped bounding block.

21. The system of claim 15, wherein the input document comprises an input resume document submitted by the user to a job recommendation system.

22. The system of claim 15, wherein the input document comprises an input job description document submitted to a job recommendation system by the user as an employer.

* * * * *